(12) United States Patent
Clifford et al.

(10) Patent No.: US 9,709,249 B2
(45) Date of Patent: Jul. 18, 2017

(54) ARROW BOARD LIGHT AND TOUCH CONTROLLER

(71) Applicant: Checkers Industrial Products, LLC, Broomfield, CO (US)

(72) Inventors: Scott Clifford, Mesa, AZ (US); Steven N. D. Brundula, Chandler, AZ (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 80 days.

(21) Appl. No.: 14/509,997

(22) Filed: Oct. 8, 2014

(65) Prior Publication Data

US 2016/0102846 A1    Apr. 14, 2016

(51) Int. Cl.
| | |
|---|---|
| *F21V 17/14* | (2006.01) |
| *H05B 37/02* | (2006.01) |
| *G08G 1/095* | (2006.01) |
| *G08G 1/0955* | (2006.01) |
| *F21W 111/02* | (2006.01) |
| *F21Y 115/10* | (2016.01) |

(52) U.S. Cl.
CPC ............. *F21V 17/14* (2013.01); *G08G 1/095* (2013.01); *G08G 1/0955* (2013.01); *H05B 37/0218* (2013.01); *F21W 2111/02* (2013.01); *F21Y 2115/10* (2016.08)

(58) Field of Classification Search
CPC .... F21V 19/004; F21V 19/0045; F21V 17/16; F21V 17/00; F21V 17/104; F21V 17/14; F21V 19/003; F21V 19/0035; F21V 19/0055; F21K 9/30; F21W 2111/02; F21W 2111/023; F21W 2111/027; G09F 9/30; G09F 9/33; G09F 9/3026; G09F 2013/222

See application file for complete search history.

(56) References Cited

U.S. PATENT DOCUMENTS

| | | | | |
|---|---|---|---|---|
| 3,524,981 A | * | 8/1970 | Auerbach | F21V 17/14 362/433 |
| 5,309,342 A | * | 5/1994 | Heinen, Sr. | F21S 8/02 362/147 |
| 5,400,228 A | * | 3/1995 | Kao | G09F 9/33 362/231 |

(Continued)

FOREIGN PATENT DOCUMENTS

GB          279179 A  * 10/1927  ............. G09F 19/18

*Primary Examiner* — Robert May
(74) *Attorney, Agent, or Firm* — Holland & Hart

(57) ABSTRACT

A hooded light head assembly for providing directional lighting is provided which comprises a light housing having a hood. The light housing has an internal light source and a rear attachment surface that has an insert extension. The insert extension is configured to attach the light housing to mounting surface upon insertion into an opening in the mounting surface and upon rotation of the light housing relative to the mounting surface. Some of these hoods also have a locking tab extending rearward from the surface that may prevent removal of the hood from the mounting surface. The light head may also have a controller having touch sensitivity and set to indicate light head status and prevent reversed current through the light heads. An arrow board using the controller and light heads may be easily installed and may be durable and reliable in outdoor conditions.

26 Claims, 11 Drawing Sheets

(56) References Cited

U.S. PATENT DOCUMENTS

| | | | | |
|---|---|---|---|---|
| 5,410,328 | A * | 4/1995 | Yoksza | G09F 9/33 345/82 |
| 5,779,351 | A * | 7/1998 | Erickson | G09F 9/33 362/240 |
| 5,896,093 | A * | 4/1999 | Sjobom | B60Q 7/00 257/E33.067 |
| 6,971,196 | B2 * | 12/2005 | Fernandez | G09F 7/00 40/452 |
| 2012/0320627 | A1 * | 12/2012 | Araki | F21S 8/04 362/608 |
| 2013/0241426 | A1 * | 9/2013 | Dohn | F21K 9/1375 315/200 R |
| 2014/0218933 | A1 * | 8/2014 | Feng | F21V 21/00 362/296.01 |
| 2015/0035437 | A1 * | 2/2015 | Panopoulos | F21V 14/02 315/112 |

\* cited by examiner

ARROW BOARD LIGHT AND TOUCH CONTROLLER

TECHNICAL FIELD

The present disclosure generally relates to light heads used in areas such as, for example, traffic control and industrial safety, and specifically relates to housings and controllers for light heads used in arrow boards.

BACKGROUND

Lighted arrow boards are used for many purposes, including, for example to direct traffic and convey information to the public. Typically, an arrow board comprises about 15-25 light assemblies or heads spaced across the surface of a panel in a pattern that can be used to generate arrows, diamonds, chevrons, and other patterns based on the number and position of lights that are active at once. In order to enhance daytime visibility and to direct the light pattern in a desired direction, the lights are usually positioned within tube-shaped hoods. A light source such as a bulb or light emitting diodes (LEDs) is connected within the light head behind a protective lens or transparent cover.

Construction of conventional arrow boards is time-consuming work. Each of the hoods of the light heads are mounted to the board by screws or other similar fasteners with 3-4 screws per hood. Thus, with a 25-light arrow board and 4 screws per hood, 200 screws must be installed, so a significant expense of labor and time for construction is incurred on each arrow board.

While modern arrow boards use efficient LEDs as a light source, the low individual light output of single LEDs often causes manufacturers to have to implement 10-20 LEDs per light head in order to produce the required brightness for day and night viewing. With such a large number of LEDs, the light heads have electronic inefficiencies and extra costs due to high component counts and electronic losses.

Controllers for the arrow boards also have undesirable drawbacks. Usually, a controller uses mechanical switches for changing modes and the on/off functions of the board. Mechanical switches are expensive and prone to failure after extended use and exposure to the environment. The size of the switches also increases the bulkiness of the controller. Additionally, controllers usually lack sufficient protection from shorts and faults.

There is therefore a need for improvements in lighted arrow boards and the light head assemblies used for directional lighting in general.

SUMMARY

In one aspect of the present disclosure, a hooded light head assembly for providing directional lighting is provided that may comprise a light housing having a hood. The light housing may have an internal void and a rear attachment surface. An internal light source may be positioned within the internal void and configured to direct light through the hood. This internal light source may be electrically powered. The hood may be configured to extend from the light housing to shield the internal light source from ambient light. A transparent member may be positioned in the light housing between the internal light source and the hood. An insert extension may extend from the rear attachment surface, with the insert extension being configured to attach the light housing to a mounting surface upon insertion of the insert extension into an opening in the board panel and upon rotation of the light housing relative to the mounting surface.

This hooded light head assembly may further comprise a locking tab extending rearward from the rear attachment surface, wherein the locking tab may be configured to attach the light housing to the mounting surface upon rotation of the light housing in a first direction, and the locking tab preventing rotation of the light housing in a second direction opposite or opposing the first direction. This locking tab may releasably prevent rotation of the light housing, such as by preventing rotation by being insertable into a locking aperture in the mounting surface.

The hooded light head assembly may also comprise the mounting surface, and the mounting surface may include a plurality of openings and a plurality of light housings interlocked with the plurality of openings. The light housing may be configured to only be secured to the mounting surface by the insert extension and/or a locking tab. The mounting surface may be part of an arrow board, a traffic light signal, an area light, or another related apparatus.

The hooded light head assembly may further comprise a lens positioned within the light housing and configured to refract light emitted from the internal light source through the hood. The lens may be rotationally asymmetric.

The light housing may be sealed against invasion of dust or water to the internal light source, such as, for example, by an air-permeable vent in the light housing.

An electronic controller may be configured to control the internal light source. This electronic controller may comprise a touch-based control instrument and may be configured to output a signal indicating an inoperative internal light source positioned in the base housing.

The controller may also be configured to automatically sense a quantity of internal light sources positioned in the base housing. An ambient light sensor may be included that allows the controller to be configured to adjust light intensity of the internal light source in response to a measurement transduced by the ambient light sensor.

In another aspect of the disclosure, a method of installing a light head to a mounting surface is set forth, comprising: providing a mounting surface panel, the mounting surface panel having a plurality of mating openings surrounding the light opening; providing a light head having a rear surface, the light head having a plurality of mating inserts extending from the rear surface; inserting the plurality of mating inserts into the plurality of mating openings; and securing the plurality of mating inserts in the plurality of mating openings by rotating the light head relative to the mounting surface panel.

The light head may be permanently locked within the mating openings upon rotation. Rotating the light head relative to the mounting surface panel may secure a locking tab in the mounting surface panel, with the locking tab preventing reverse rotation of the light head. Unlocking the locking tab may be performed by withdrawing the locking tab from the mounting surface panel.

Another embodiment may comprise a directional lighting apparatus having a plurality of lighted head assemblies each having an internal light source and a controller controlling the plurality of light sources. The controller may be configured to control individual current provided to each of the plurality of light sources and configured to prevent reversed current through the plurality of light sources.

The controller may be configured to indicate a status of the plurality of light sources. This directional lighting apparatus may further comprise an ambient light sensor, wherein the controller may be configured to control brightness of the plurality of light sources based on a measurement sensed by the ambient light sensor. The directional lighting apparatus may further comprise a touch panel connected to the controller, wherein the touch panel is configured to control a lighting pattern formed by the plurality of lighted head assemblies. The controller may be configured to detect the number of lighted head assemblies in the directional lighting apparatus. A directional lighting apparatus may be, for example, an arrow board, traffic sign, or directional lighting device.

The above summary of the present invention is not intended to describe each embodiment or every implementation of the present invention. The Figures and the detailed description that follow more particularly exemplify a preferred embodiment.

DETAILED DESCRIPTION

Many drawbacks found in existing arrow boards are addressed by an arrow board having hooded light assemblies with a low number of LEDs, a screw-less light head, and a controller with individual light current control, automatic light board detection, small size, and touch control. A hooded light head assembly for an arrow board may have insert extensions that are configured to attach a light housing to a board panel. The insert extensions may be inserted into slots in the board panel, and the light housing may be rotated relative to the board panel to cause an interference fit. Thus, no fasteners may be required to attach the light housing to the board panel, and the assembly of the arrow board may be significantly less labor intensive. In some cases, a locking tab may be implemented to prevent removal of the light housing from the board.

The number of LEDs used to produce sufficient head brightness may also be significantly reduced in the present arrow board assemblies. An asymmetric Fresnel lens may provide the required light spread for each light head assembly while only requiring about 1 or 2 LEDs per head. This may reduce cost, part count, and assembly labor, among other benefits.

Another beneficial feature of the present light head assemblies may include protection of the light head components against invasion of dust or water. A vent opening in the housing may be provided that is air-permeable but may still seal the assembly against moisture and debris due to application of a protective cover or plug over the vent opening.

In some cases, the arrow board may comprise an electronic controller that may be substantially more compact and durable than existing controllers. The controller may include a touch-sensitive control interface that eliminates the need for large and expensive mechanical switches while still providing an intuitive and sturdy user experience. The controller may automatically control light head brightness, current, and other features of the arrow board. Inoperative light heads may be identified by the controller for simple and fast arrow board troubleshooting. The controller may also be configured to automatically detect the number of light heads in use on the board and then immediately and accordingly switch between control schemes.

Figure 1:
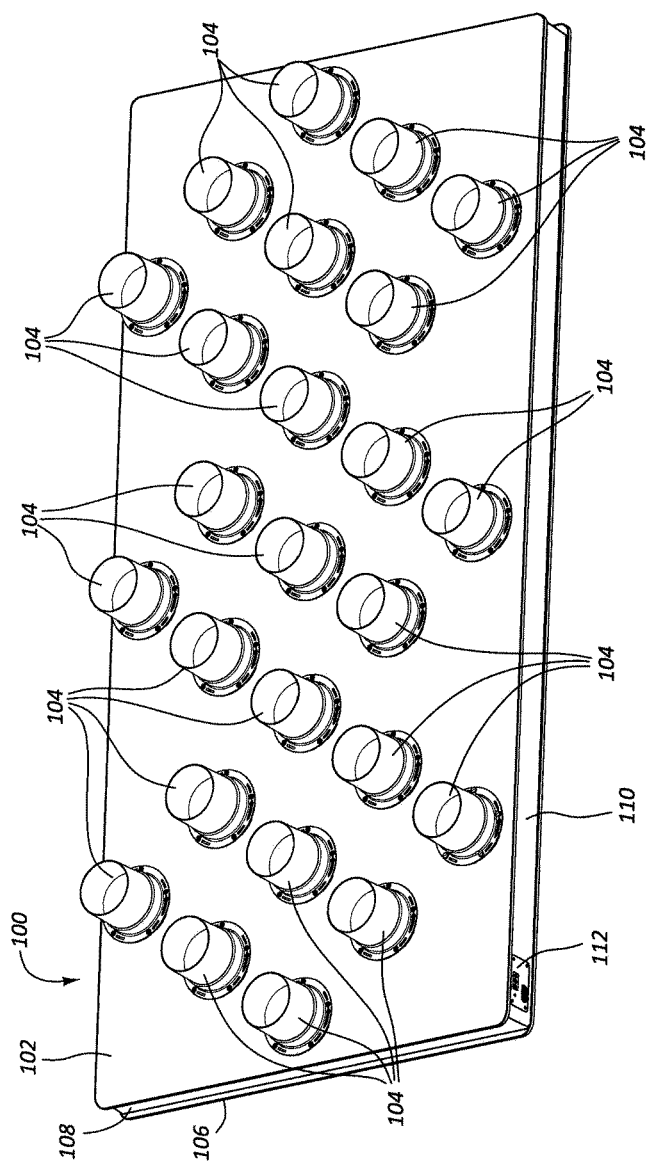
FIG. 1 is a perspective view of the front of an arrow board.

Referring now to the figures in detail, FIG. 1 shows an example of an embodiment of an arrow board 100 according to the present disclosure. The arrow board 100 may comprise a front panel 102 having a plurality of openings (see FIG. 12) through which light heads 104 may be attached in a predetermined pattern. The arrow board 100 may also have a back panel 106 separated from the front panel 102 by a plurality of side panels, such as side panels 108, 110. A controller 112 may be housed by the arrow board 100 and may be accessible through one of the front, back, or side panels 102, 106, 108, 110.

Arrow board 100 may be an arrow board used in fields such as, for example, construction, traffic, and industrial safety. The arrow board 100 shown in FIG. 1 is shown having 25 light heads 104 in a triple-diamond pattern. In other embodiments, the number of light heads 104 may be greater or less than 25, such as, for example, 15 light heads, which is another common number of light heads in related applications. The pattern of the light heads may vary from the triple-diamond pattern as well, such as, for example, being in an arrow shape, chevron, a grid, a straight line, circle, or other useful pattern. Light heads 104 may be controlled to display symbols, characters, words, phrases, and other information depending on the configuration of the controller and the position of the light heads.

The arrow board 100 may be mounted to a variety of support structures, such as, for example, trailers, skids, vehicles, struts, stands, and other commonly known supports for arrow boards. The arrow board 100 may beneficially be mounted in a manner allowing access to the controller 112. For example, if the arrow board 100 is mounted on a tall strut, the controller 112 may be positioned on the bottom of the arrow board 100. The arrow board 100 may also be mountable in such a manner that the light heads 104 are directed horizontally away from the front panel 102 to provide visibility of the internal lights to observers.

While the arrow board 100 in the pictured embodiment has a rectangular perimeter, other shapes may be implemented in place of a rectangle. For example, the arrow board 100 may have a front panel 102 that is square, circular, hexagonal, octagonal, diamond-shaped, arrow-shaped, or another desired shape known in the art of arrow boards and lighted signs.

The arrow board 100 may have a power source (not shown) such as, for example, a local generator or energy storage device. In some applications, a generator may comprise a solar panel or fuel-based power source, and an energy storage device may comprise a battery.

Front panel 102 may comprise a metal, polymer, composite, or other durable and rigid construction material. The front panel 102 may therefore support the weight of the light heads 104 and may be rugged and water resistant for extended outdoor usage. The front panel 102 may beneficially be black or another dark color to increase contrast and visibility of the light sources in the light heads 104. In some embodiments, the front panel 102 may be painted a dark color. The front panel 102 may also comprise information, such as text, symbols, or other messages to alert and inform observers. In some arrangements, a front panel 102 may protect and cover internal components such as an energy storage device, wiring, and the controller 112 from damage and exposure.

Back panel 106 may also house and protect components within the arrow board 100. The back panel 106 may further include brackets or other connecting apparatus for mounting the arrow board 100 to a stand or suspension support. In some embodiments, one or more side panels such as side panels 108, 110 may have apparatus used to mount the arrow board 100.

Controller 112 may be mounted in various positions on the arrow board 100. the controller 112 is shown in a bottom side panel 110 in FIG. 1, but in other embodiments the right side panel 108, front panel 102, back panel 106, a top panel (not shown), or a left side panel (not shown) may be used. A controller 112 may also be positioned separate from the arrow board 100, such as, for example, on a support structure, on a cart, or elsewhere remote from the arrow board 100 and panels 102, 106, 108, 110. Additional embodiments and features of a controller are also discussed herein with reference to FIG. 13.

Figure 2:
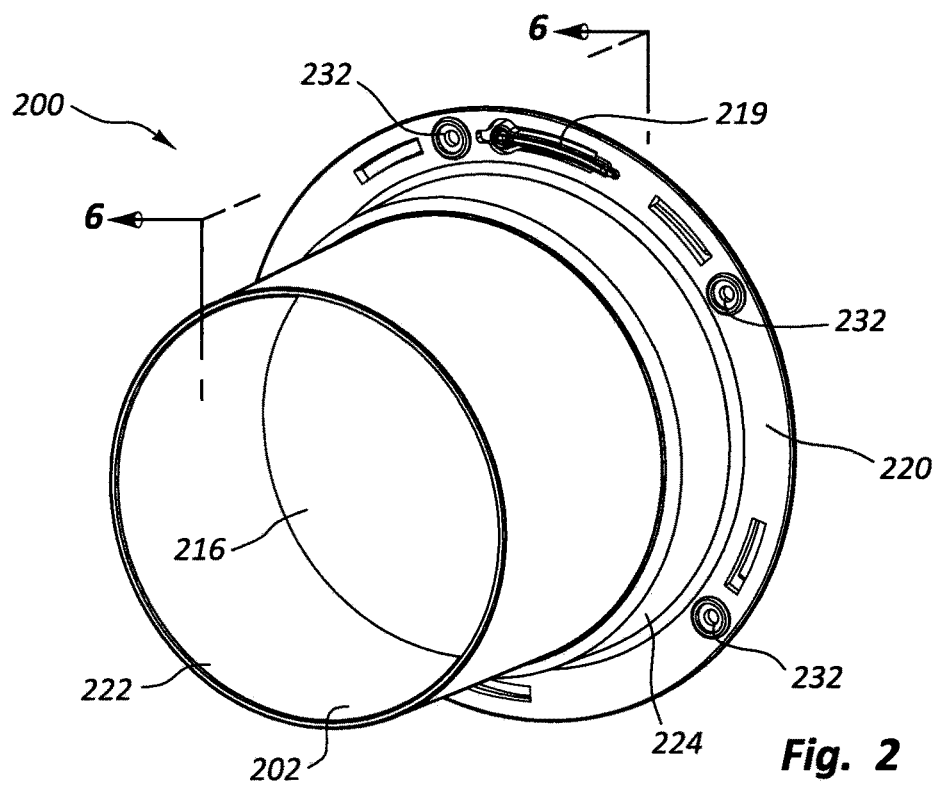
FIG. 2 is a perspective view of the front of a light head usable in the arrow board of FIG. 1.
Figure 3:
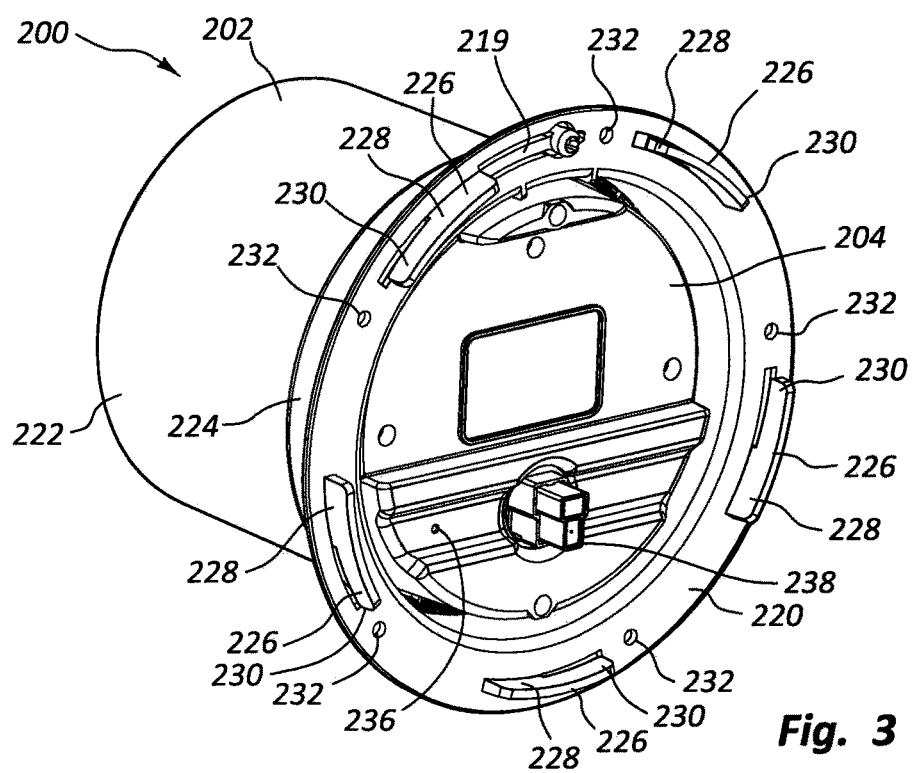
FIG. 3 is a perspective view of the rear of the light head of FIG. 2.
Figure 4:
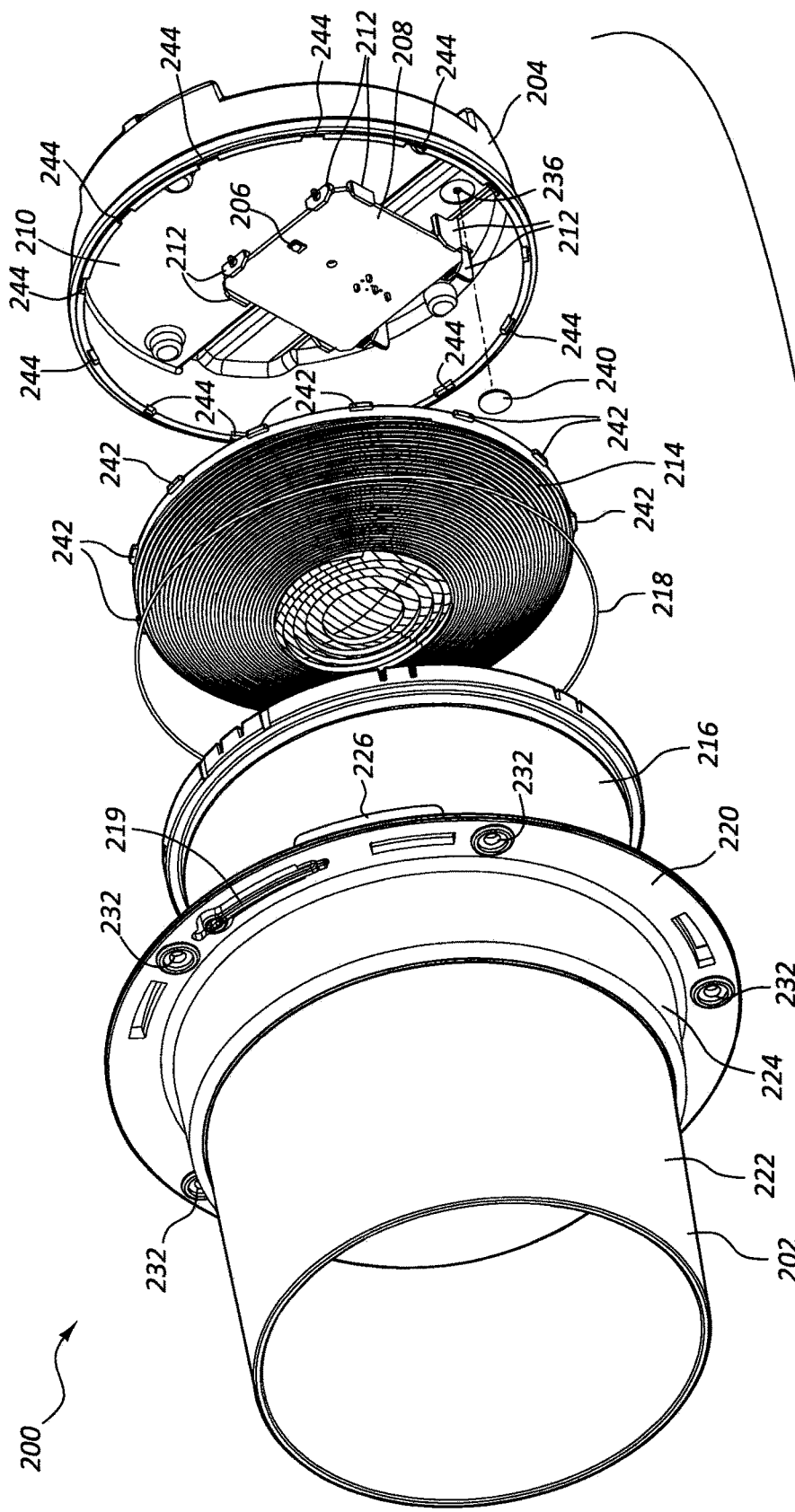
FIG. 4 is an exploded frontal view of the light head of FIG. 2.
Figure 5:
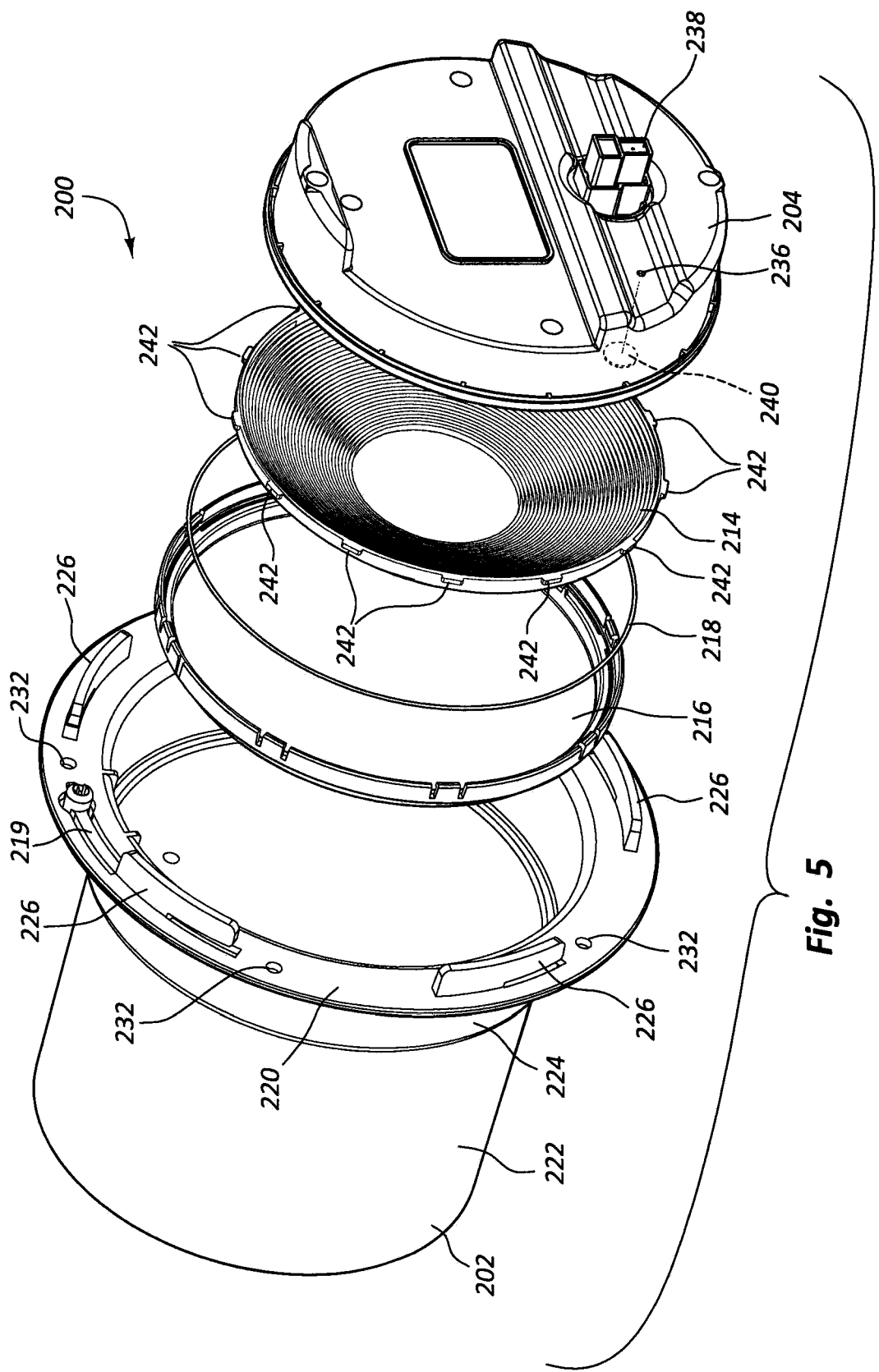
FIG. 5 is an exploded rear view of the light head of FIG. 2.
Figure 6:
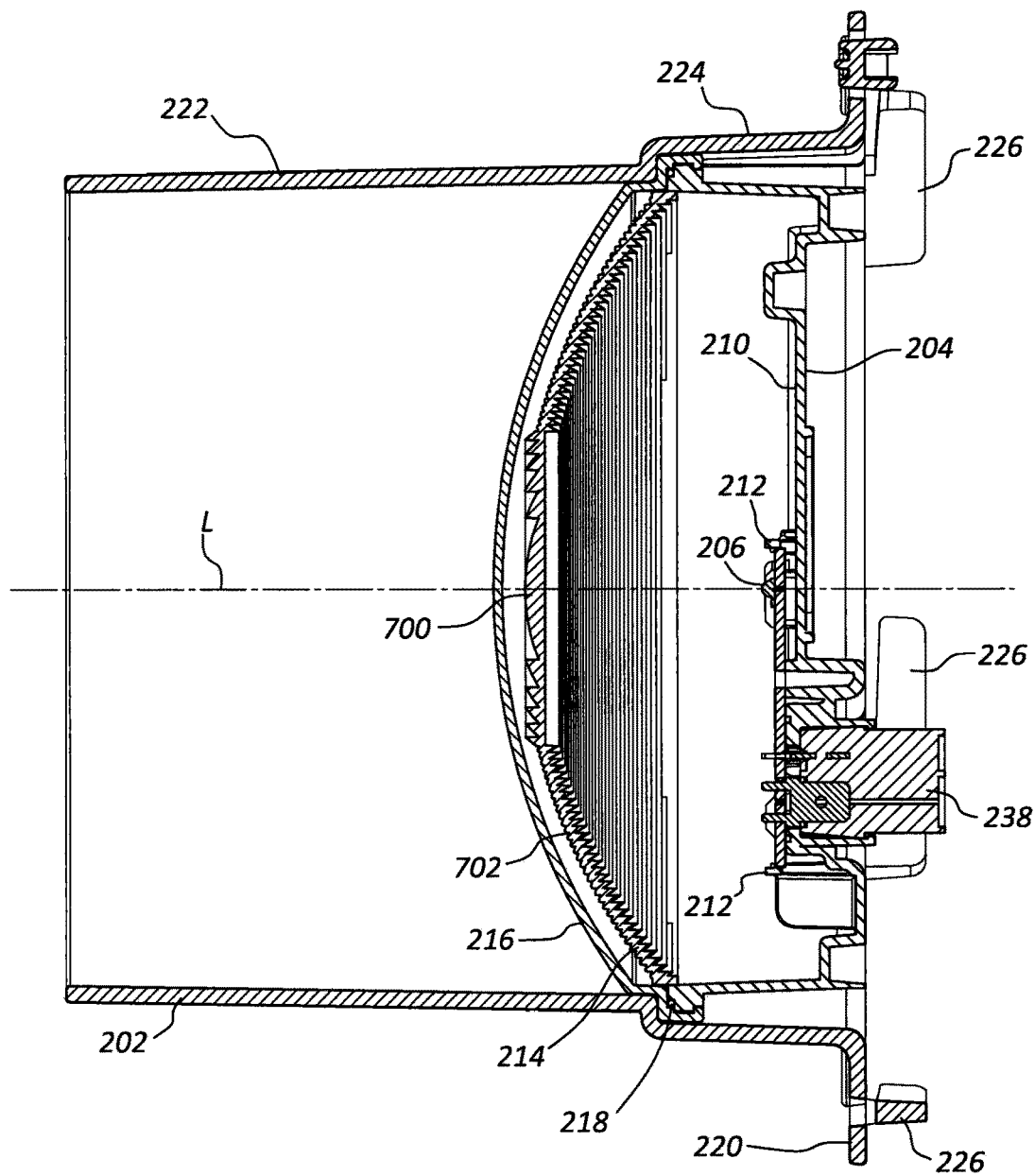
FIG. 6 is a side section view of the light head of FIG. 2 taken through section lines 6-6 indicated in FIG. 2.

FIGS. 2-6 show detailed views of a light head 200 configured for use in an arrow board (e.g., arrow board 100). The front of the light head 200 is shown in FIG. 2, the rear of the light head 200 is in FIG. 3, and FIGS. 4-5 are exploded views of the front and rear of the light head 200, respectively. FIG. 6 shows a side section view of the light head 200 taken through section lines 6-6 in FIG. 2.

The light head 200 may include a hood 202 and a back plate 204. A light source may be positioned within the hood 202 and back plate 204. In this embodiment, the light source is a light emitting diode (LED) 206 (see FIGS. 4 and 6). The LED 206 is positioned on a printed circuit board (PCB) 208 mounted to an inner surface 210 of the back plate 204 by brackets 212. A lens 214 and transparent cover 216 may be mounted to the back plate 204 within the hood 202. At least one of the lens 214 and transparent cover 216 may be referred to as a transparent member since each is at least partially transparent. The transparent cover 216 may be sealed to the back plate 204 with an O-ring 218. A locking tab 219 may be positioned in an outer flange 220 of the hood 202.

Hood 202 as shown in these figures comprises a generally hollow cylindrical tube having an outer flange 220. The tube of the hood 202 may be formed with a shade portion 222 and a body portion 224. The shade portion 222 may extend away from the body portion 224 and the outer flange 220 to shade the transparent cover 216 and other components within the body portion 224 from external peripheral light. The body portion 224 may be positioned around the back plate 204 and may be widened relative to the shade portion 222 to keep the transparent cover 216 from moving through the central passage through the shade portion 222. In some embodiments, one or more portions of the hood 202 may only comprise a partial cylinder with an opening on one or more lateral or vertical sides. The hood 202 may also have other cross-sectional shapes, such as, for example, a tubular square or rectangle. The material of the hood 202 may beneficially be a UV-treated, high-impact, engineering-grade plastic that is durable yet light.

The outer flange 220 of the hood 202 may comprise a plurality of insert extensions 226 (see FIGS. 3 and 5). The outer flange 220 may be referred to as a portion of the housing having a rear attachment surface. The insert extensions 226 may extend rearward from a back surface of the outer flange 220 and may be configured to be inserted into a board panel. Insert extensions 226 may alternatively be referred to as mating inserts or cleats that may fit into mating openings in the arrow board. See FIG. 12.

The insert extensions 226 may each comprise a first portion 228 extending rearward from the outer flange 220 and a second portion 230 extending circumferentially away from the first portion 228 so that the second portion 230 is spaced rearward from the outer flange 220 in a manner which may or may not be curved to follow a radius of the outer flange 220. By inserting the insert extensions 226 into the slots in the front panel of the arrow board and then rotating the light head 200 around its longitudinal axis (i.e., axis L; see FIG. 6), the insert extensions may provide an interference fit that prevents the light head 200 from being longitudinally withdrawn without being rotated back to its insert position.

In the pictured embodiment, five insert extensions 226 extend from the outer flange 220, but in other embodiments, a greater or smaller number of insert extensions may be used. The insert extensions 226 may be evenly circumferentially spaced, but in other embodiments, they may be irregularly spaced or may be spaced radially in addition to being spaced circumferentially.

The general shape of the insert extensions 226 in the presently depicted embodiment is a curved "L" shape, but a hook shape, right angle shape or other comparable shape that would not immediately be withdrawable from the arrow board front panel after rotation may also be usable.

In at least one alternative embodiment, apertures may be formed in the outer flange 220 in place of the insert extensions 226. The apertures may comprise a widened end and a narrowed end, and the front panel of the arrow board may comprise a plurality of tabs corresponding to the apertures. The light head 200 in these embodiments would be attachable to the front panel by inserting the tabs through the widened ends of the apertures and rotating the light head 200 relative to the front panel, thereby moving the tabs to overhang the narrowed ends of the apertures and preventing longitudinal withdrawal of the light head 200.

In some embodiments, fastener apertures 232 may be provided through the outer flange 220 to allow the hood 202 to be secured to a front panel that lacks slots for the insert extensions 226. Thus, fasteners (e.g., bolts or screws) may be used to attach the light head 200 to the front panel if necessary.

Back plate 204 may have an inner surface 210 (i.e., front surface) and an outer surface 234 (i.e., rear surface). The back plate 204 may comprise a vent opening 236 extending between the inner surface 210 and outer surface 234. The vent opening 236 may be positioned adjacent to an electrical connector 238 extending from the PCB 208 through the back plate 204. The vent opening 236 may be covered by a vent cover 240. The vent cover 240 may be air-permeable but waterproof and non-porous or micro-porous, such as, for example, expanded polytetrafluoroethylene (ePTFE) tape (e.g., GORE-TEM)) material. The vent cover 240 may therefore prevent intrusion of water and debris into the light head 200 while allowing air to pass through and temperature and pressure to equalize inside and outside the light head 200. This may counter the occurrence and appearance of condensation and dust within the light head 200, thereby extending its usable lifespan and durability in harsh outdoor environments.

The LED 206 may comprise about one or two LEDs and may act as an electronic light source that is positioned internal to the light head 200. As compared to a conventional light head or even a modern light head, the number of LEDs may be low in this embodiment due to recent improvements in LED brightness and the design and function of an improved asymmetric lens 214 described further within this document. In other embodiments, the number of LEDs may be greater. The LED 206 may be positioned on the PCB 208 to preferably lie central to the opening through the hood 202 and central to the lens 214. In a preferred embodiment, the color of the LED may be white, and the transparent cover 216 may have a color tint that changes the color of the light emitted from the LED as viewed by observers. In other embodiments, the LED may emit a different color itself (e.g., an amber or red color) or the transparent cover 216 may have a tint. An LED 206 may be designed to meet high and low speed requirements in day and night operation. During high speed daytime conditions, the LED 206 may produce at least 500 candela (cd), and preferably at least 625 cd, and during low and high speed night conditions, the LED may produce at most 370 cd. One beneficial LED that may be implemented is a phosphor converted LEDs due to their higher efficiency than other conventional LEDs.

PCB 208 may be attached to the back plate 204 by brackets 212 extending from the inner surface 210 of the back plate 204. The brackets 212 may allow the PCB to be snapped into place relative to the back plate 204, reducing labor during assembly of the light head. The PCB 208 may have minimal size so as to reduce costs. The electrical connector 238 may be in electrical communication with the PCB 208. The sealing of the transparent cover 216 and the back plate 204 may prevent moisture and debris from accumulating on the PCB 208 and damaging the electronics within the housing. In some embodiments, the PCB 208 may be attached to the back plate 204 using fasteners instead of brackets 212. The electronics may provide a constant voltage to the LEDs under high and low intensity light settings of about 10 to about 15 volts by regulating the current provided to the LEDs as the voltage of a power source (e.g., solar panel or battery) changes.

Lens 214 may be positioned between the transparent cover 216 and the back plate 204 to protect it from damage and wear. The lens 214 may therefore also stay clean and able to direct light as needed by the light head 200. The lens 214 may have an asymmetric, multi-section design, as described in further detail in connection with FIGS. 7-9 herein. The lens 214 may comprise a transparent polymer or glass material that is capable of providing the optics necessary to direct the light emitted by the LED 206. The lens 214 may also comprise tabs 242 extending from a perimeter of the lens 214 that may be seated in recesses 244 on the back plate 204. See FIGS. 4-5. These tabs 242 and recesses 244 may be used to keep the lens 214 oriented in a desired direction relative to the back plate 204 and light source (e.g., LED 206). This may be beneficial because the asymmetry of the lens 214 may require a specific orientation of the lens 214 to be most effective.

Transparent cover 216 may comprise a transparent material such as a polymer or glass that may provide protection to the lens 214 and other internal components of the light head 200 while allowing light from the light source to be visible from outside the light head 200. The transparent cover 216 may be configured to at least partially extend around the perimeter of the back plate 204 as shown in FIG. 6. In some embodiments, the back plate 204 may be configured to extend around the perimeter of the transparent cover 216. The O-ring 218 may be positioned between the back plate 204 and the transparent cover 216 to seal their contact against intrusion of debris and moisture.

Figure 8:
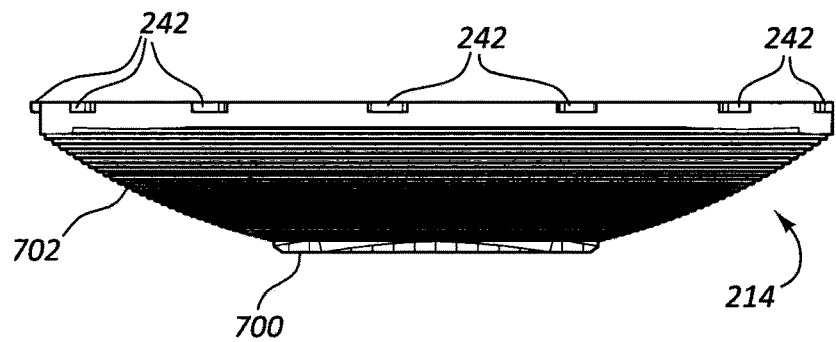
FIG. 8 is a top view of the lens of FIG. 7.
Figures 7, 9:
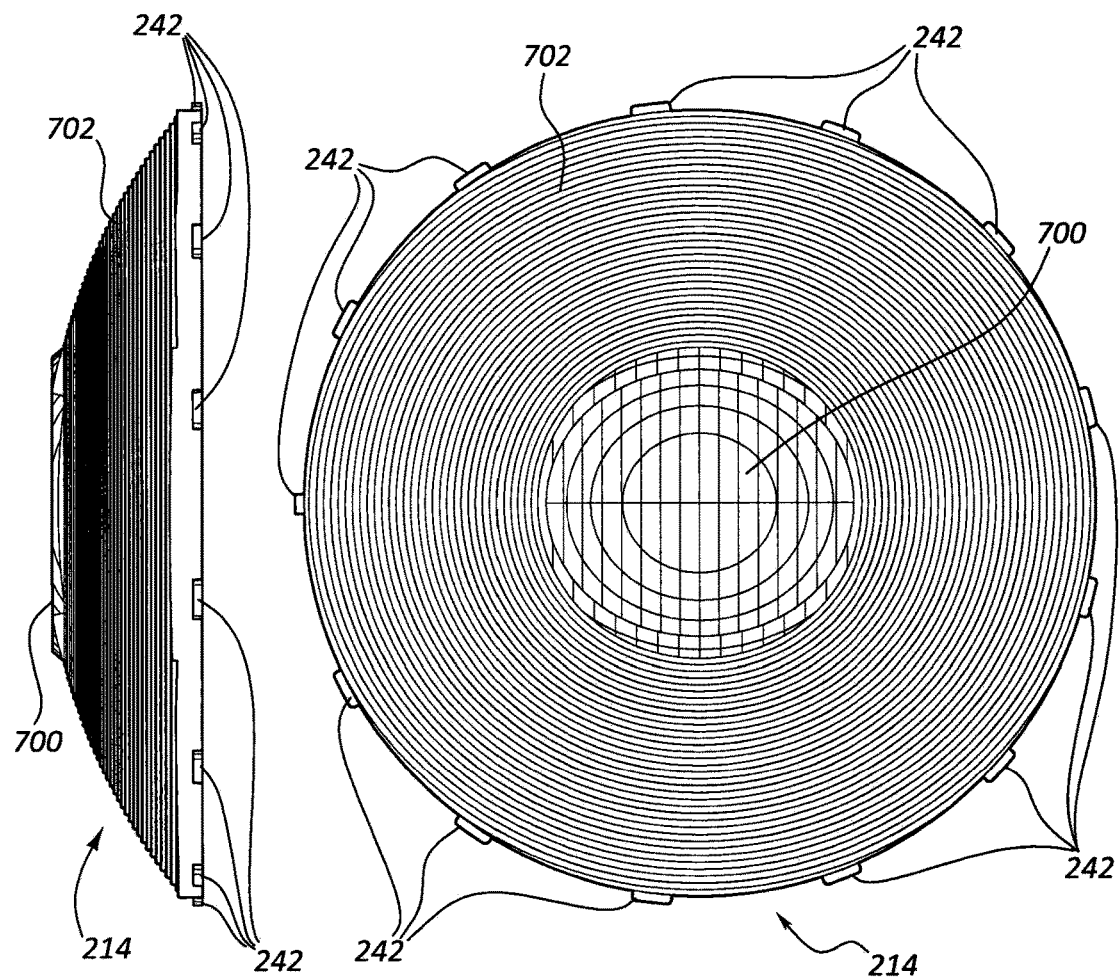
FIG. 7 is a front view of a lens used in a light head of the present disclosure.
FIG. 9 is a right profile view of the lens of FIG. 7.

FIGS. 6-9 are detailed views of the lens 214 used in a light head 200. FIG. 6 is a side section view of the light head 200 taken through the section lines 6-6. FIGS. 7-9 are views of the front, top, and side of the lens 214, respectively.

The lens 214 may have multiple sections. A center section 700 may be a dioptric section, and a perimeter section 702 may be a catadioptric section. Each section 700, 702 may be asymmetric. As shown in FIG. 7, the sections 700, 702 may have rotational asymmetry. The center section 700 has elliptical/egg-shaped ridges. The LED 206 is positioned directly behind the center section 700, so the asymmetric center section distributes light from the LED 206 to spread out horizontally more than vertically. The perimeter section 702 also has elliptical/egg-shaped ridges that distribute light horizontally more than vertically. The viewing angle of the light from the LED 206 is therefore greater horizontally than vertically. This allows the light head 200 to more efficiently distribute light horizontally and increases the visibility of the LED 206 by observers that are roughly at the same elevation as the LED 206, since they are more likely to move horizontally relative to the light head 200 and maintain vision of it through their movement as compared to moving vertically relative to the light head 200.

Light emitted through the lens 214 may be visible at distances up to and/or exceeding one mile. The lens 214 directs the light from the LED 206 to be columnated and directed parallel to the longitudinal axis of the light head 200 through the center section 700 of the lens 214. Light emitted peripheral to the center section 700 is redirected by the perimeter section 702 in the same direction, so minimal light is wasted to internal reflection and scattering. Conventional lenses for light heads have total internal reflection (TIR) portions or may have many separate lens portions configured to focus light emitted by 10-20 LEDs within the light head. These designs are less efficient as they require many more LEDs and waste more off-center light.

In some embodiments, more than two sections 700, 702 of the lens 214 may be implemented. The relative size of the sections 700, 702 may also be modified to accommodate brighter or dimmer LEDs. The degree of eccentricity of the elliptical ridges of the sections 700, 702 may be modified to increase or decrease the horizontal spread of the light from the light head 200. In some embodiments, the sections 700, 702 may be rotationally symmetric. In some arrangements, the center section 700 may extend across the entire front surface of the lens 214.

Figure 10:
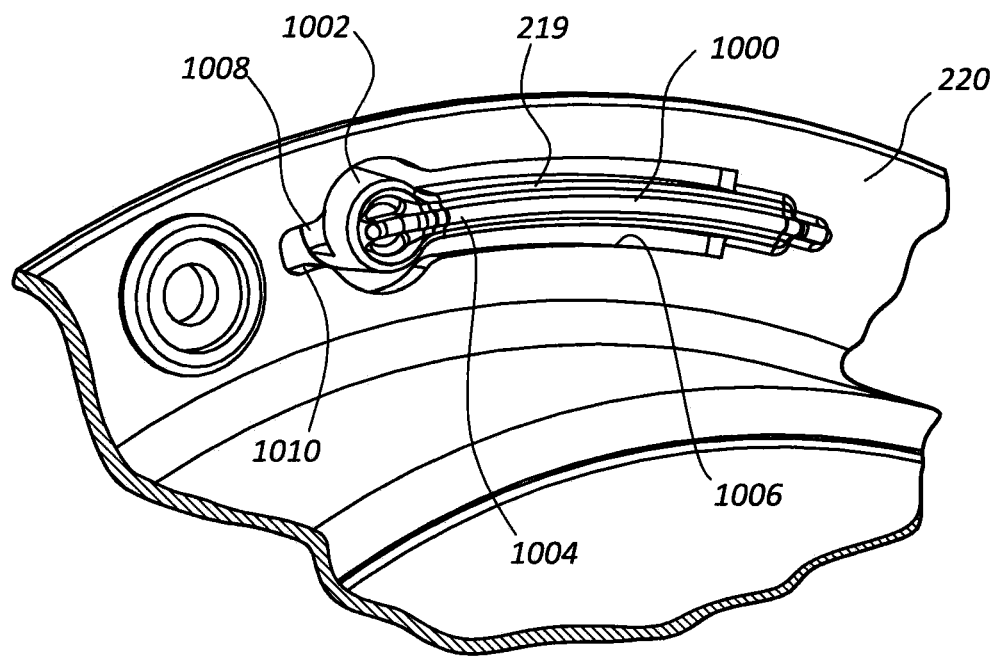
FIG. 10 is a front view of a locking tab of the light head of FIG. 2.
Figure 11:
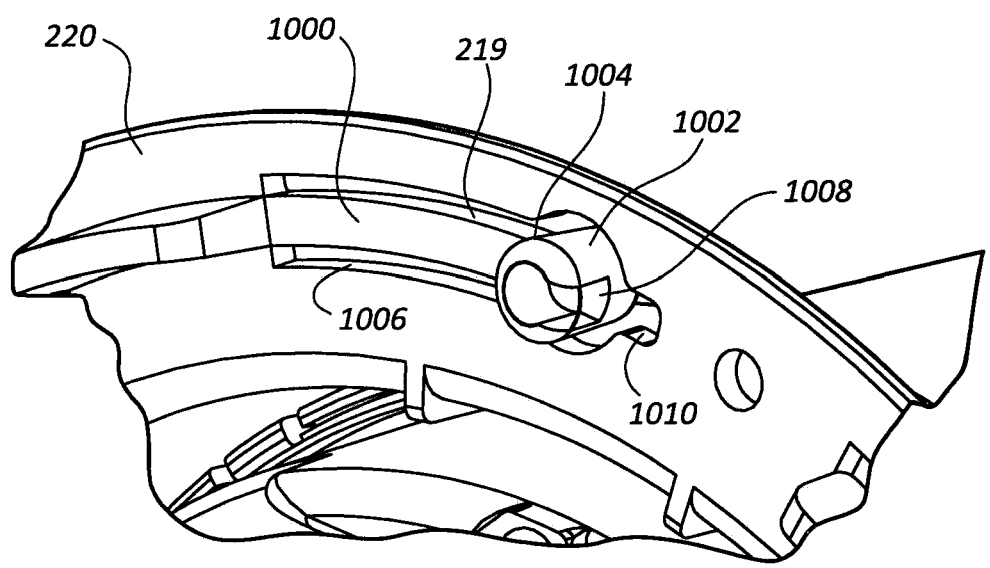
FIG. 11 is a rear view of the locking tab of FIG. 10.

FIGS. 10-11 show detailed views of the locking tab 219 positioned in the outer flange 220 of the hood 202. FIG. 10 is a front view of the locking tab 219 and FIG. 11 is a rear view. The locking tab 219 may comprise a shaft portion 1000 and a head portion 1002. The locking tab 219 may be used to prevent rotation of the light head 200 once it has been attached to a board panel. See also FIG. 12 and its related description herein. In some embodiments, the locking tab 219 may permanently prevent the hood 202 from being removed from the arrow board, but in some embodiments the locking tab 219 may releasably hold the hood 202 to the board.

The shaft portion 1000 may be connected to the outer flange 220, and the head portion 1002 may be attached to a free end 1004 of the shaft portion 1000. The free end 1004 of the shaft portion 1000 may be within an opening 1006 in the outer flange 220 of the hood 202. Thus, the locking tab 219 may be surrounded in three directions by an aperture through the outer flange 220 and may be attached to the outer flange 220 at one side. The shaft portion 1000 may be elongated and resiliently flexible relative to the outer flange 220, such that when pressure is applied against the free end 1004, the shaft portion 1000 may elastically bend toward the front of the light head 200. The shaft portion 1000 may be curved to follow the curve of the outer flange 220 along the radial position of the head portion 1002 as the light head 200 is rotated around its longitudinal/light-directing axis.

The head portion 1002 may comprise a cutout 1008. The cutout 1008 may be a void or aperture in the head portion 1002, as shown in FIG. 11. The cutout 1008 may be accessible from the front of the outer flange 220 by inserting a tool (e.g., a small-tip screwdriver) into the opening 1006 and into the cutout 1008. The opening 1006 may comprise an enlarged portion 1010 to accommodate insertion of a tool into the cutout 1008. By inserting a tool into the cutout 1008 from the front of the outer flange 220, the locking tab 219 may be bent forward to withdraw the head portion 1002 from a locking aperture.

In these figures, the shaft portion 1000 and head portion 1002 are shown as a single piece integrated with the outer flange 220. In some embodiments, the shaft portion 1000 and head portion 1002 may be separate from each other and/or separate from the outer flange 220.

Figure 12:
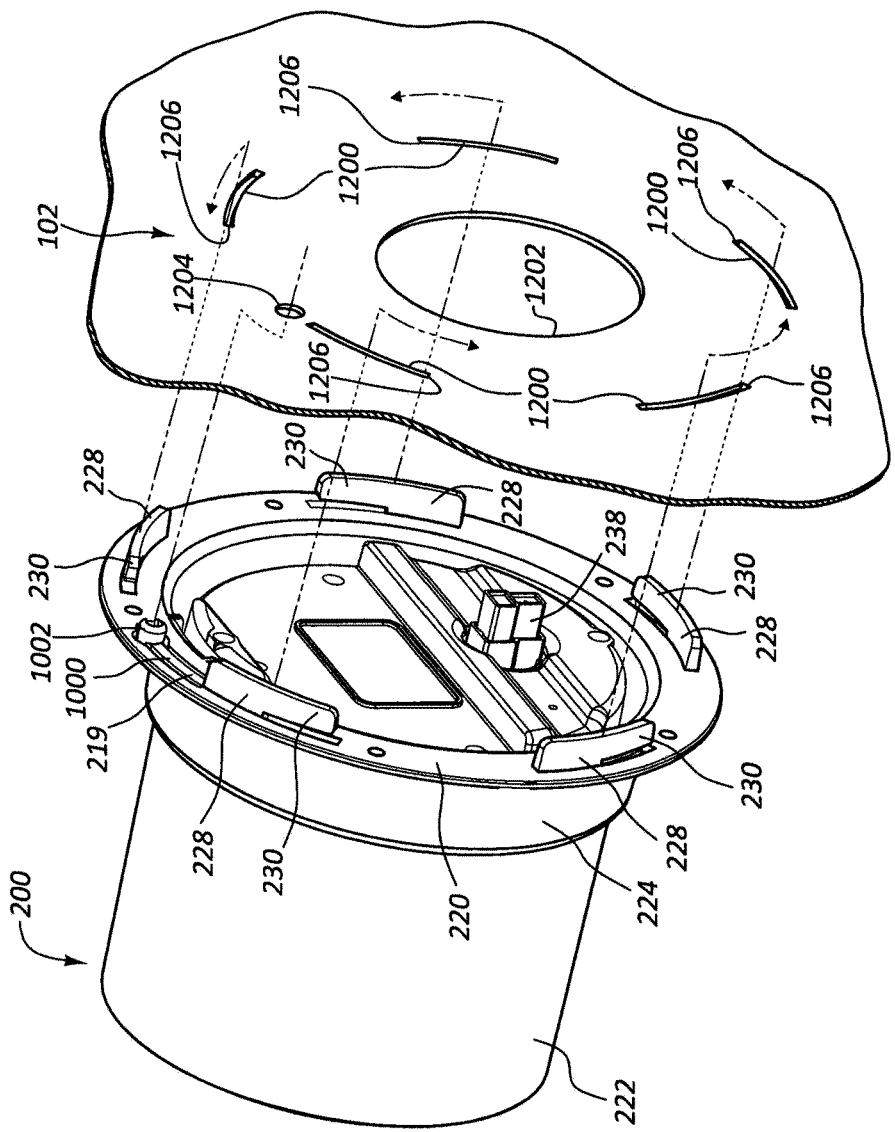
FIG. 12 is an illustration of an assembly of a front panel of an arrow board and the light head of FIG. 2.

FIG. 12 shows a portion of a front panel 102 comprising a plurality of slot-shaped openings 1200, a central opening 1202, and a locking aperture 1204. The central opening 1202 may be positioned to receive the electrical connector 238 of the light head 200 or may allow wiring to reach the electrical connector from behind the front panel 102 of the board. The slot-shaped openings 1200 may be sized and positioned to receive the first and second portions 228, 230 of insert extensions 226 of the light head 200. The arrow markings in this figure show how the insert extensions 226 may be first inserted through the slot-shaped openings 1200 and then rotated to attach the light head to the front panel 102. Once the light head 200 has been rotated into an attached position, the second portions 230 of the insert extensions 226 may lie over the rear side of the front panel 102, and the first portions 228 of the insert extensions 226 may contact or abut the inner surfaces of the openings 1200 on three sides. For example, a first portion 228 may contact a terminal surface 1206, thereby preventing further rotation of the light head 200.

The direction of rotation that attaches the light head 200 to the front panel 102 in this manner may be referred to as a first direction of rotation. This direction of rotation may also be referred to as a light head attachment direction. A second direction (i.e., a light head removal direction) of rotation may be defined opposite the first direction of rotation. Upon sufficient rotation of the light head 200 relative to the front panel 102 in the first direction while the insert extensions 226 are inserted through the openings 1200, the light head 200 may be prevented from rotation in the second direction by the head portion 1002 of the locking tab 219 fitting through the locking aperture 1204. With the head portion 1002 extending into the locking aperture 1204 and the insert extensions 226 through the openings 1200, the light head 200 may be secured against rotation in both the first and second directions. As a result, by simply inserting and rotating the light head 200 relative to the front panel 102, the light head 200 may be attached to the front panel 102 without requiring the expense of additional fasteners or time-consuming labor in installing fasteners.

The locking tab 219 may be at least partially flexible at its shaft portion 1000 so that when the insert extensions 226 are inserted all the way through the openings 1200, the locking tab 219 may flex forward toward the front of the outer flange 220 due to the head portion 1002 contacting the flat surface of the front panel 102. When the light head 200 is rotated sufficiently in the first direction, however, the head portion 1002 of the locking tab 219 may then be biased into the locking aperture 1204. In some embodiments, this may provide audible and/or tactile feedback to the manufacturer that the light head 200 has been locked in place.

Figure 13:
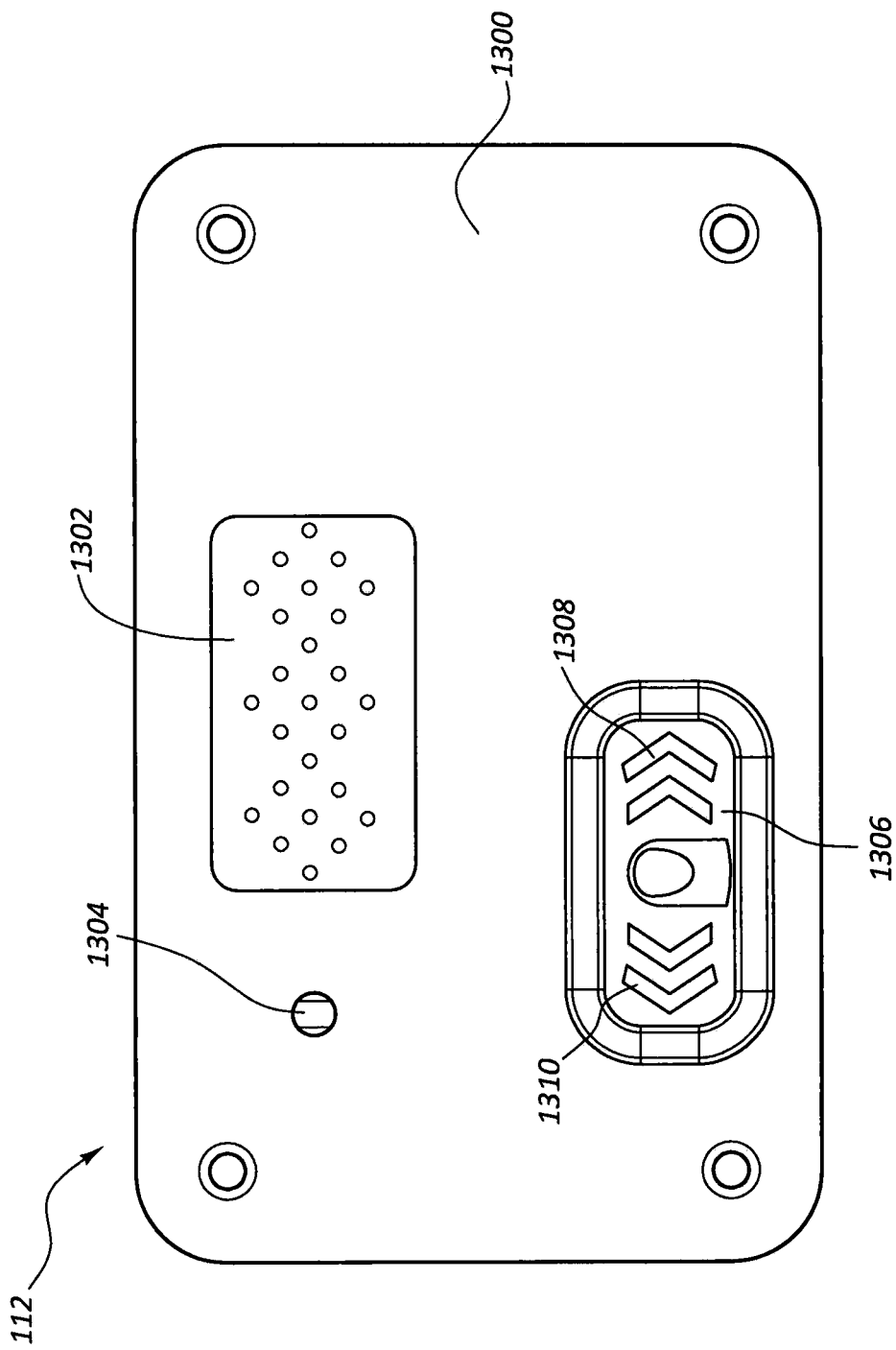
FIG. 13 is a detail view of a front panel of a controller of the arrow board of FIG. 1.

FIG. 13 shows the main panel of a controller 112 that may be used to control the light heads 104 of the arrow board 100 of FIG. 1. The controller 112 may comprise a face plate 1300 on which a status indicator 1302, a light transducer 1304, and a touch control panel 1306 may be positioned. The controller 112 may be positioned at least partially within the panels 102, 106, 108, 110 of the arrow board 100 or may be within its own housing or otherwise separate from the arrow board 100.

The status indicator 1302 may comprise a plurality of small lights configured in a pattern imitating the pattern of the light heads 104 on the front panel 102. The small lights may illuminate when the light heads 104 are illuminated. This may give an operator a preview of the displayed pattern of the light heads 104 without having to move away from the controller 112 to view the light heads 104. The status indicator 1302 may also indicate when one or more lights is malfunctioning or not lighting normally so that he may quickly troubleshoot problems with the lighted patterns. This indication may be, for example, a status indicator light not lighting or blinking to indicate a malfunction or non-lighting light head.

The light transducer 1304 may be exposed through the face plate 1300 and may be in communication with the electronics of the controller 112. The light transducer 1304 may act as an ambient light sensor used to control the brightness of the light sources in the light heads 104. In some embodiments the controller 112 may automatically control the brightness of the light heads 104 based on the ambient light levels around the arrow board 100. For instance, at night, the intensity of the LEDs may be reduced as compared to daytime functioning.

The touch control panel 1306 may provide an area for touch interaction with the controller 112. The touch control panel 1306 may have touch sensitivity that allows a finger to control the functions of the arrow board 100 such as, for example, controlling the arrow direction, pattern shown, and turning the board on and off. Touching the arrows 1308, 1310 in the touch control panel may cycle through various functions. The touch circuitry and coding may be sensitive enough to detect a finger touch when operated with gloves. Using a touch control panel 1306 may help reduce the size of the controller 112 since larger mechanical switches do not need to be used. Touch controls may also reduce the need for maintenance that would otherwise be present with a controller 112 having mechanical switches. The controller 112 may be waterproof and dust proof to improve its durability as well. The touch control panel 1306 may be referred to as a touch-based control instrument.

In some embodiments, the controller 112 may also sense the quantity of light heads 104 or type of arrow board 100 (i.e., the pattern of the light heads 104 on the board). This may allow the controller 112 to be interchangeable into various arrow boards that have different patterns or numbers of light heads 104 without a needing a separate controller 112 for each type of board.

The controller 112 may have individual current control to each of the light heads and may prevent reversed current through the light heads. This may protect the arrow board from failing due to shorts and faults.

Light heads of the present disclosure (e.g., light head 104 or 200) may be installed in mounting surfaces of many types of light apparatus. For example, many types of traffic signs, construction indicators, and other apparatus may be suited for using the weather-resistant, durable, efficient, and compact light heads described herein.

Figure 14:
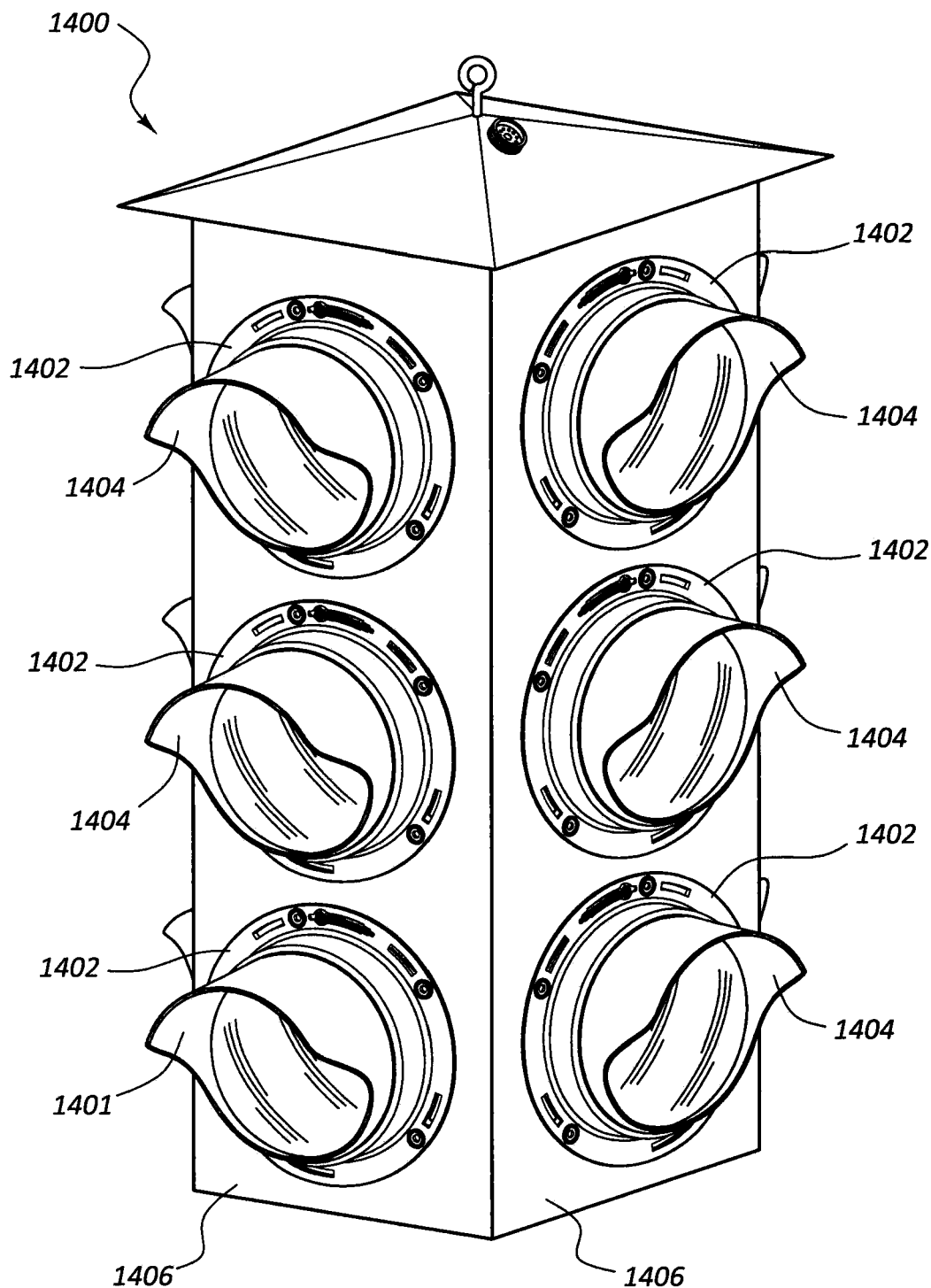
FIG. 14 is a perspective view of one alternative application of an embodiment of the present disclosure.

FIG. 14 shows one alternative application of the light heads of the present disclosure. The traffic light 1400 comprises a plurality of light heads 1402 that may direct light toward traffic. Onlookers may view different colors from each of the light heads 1402, such as the common red, green, and yellow of lighted traffic signs. The hoods 1404 of the light heads 1402 may differ from light heads 104, 200 previously described herein in order to allow better visibility of light from below the light heads 1402 in roadway applications. A controller for a traffic light 1400 may be installed within the traffic light or may remotely control the status of the light sources in the light heads 1402. Light heads 1402 may be installed in the traffic light 1400 using a mounting surface 1406 on the traffic light 1400 using methods and devices described elsewhere herein, such as, for example, in connection with FIG. 12.

Figure 15:
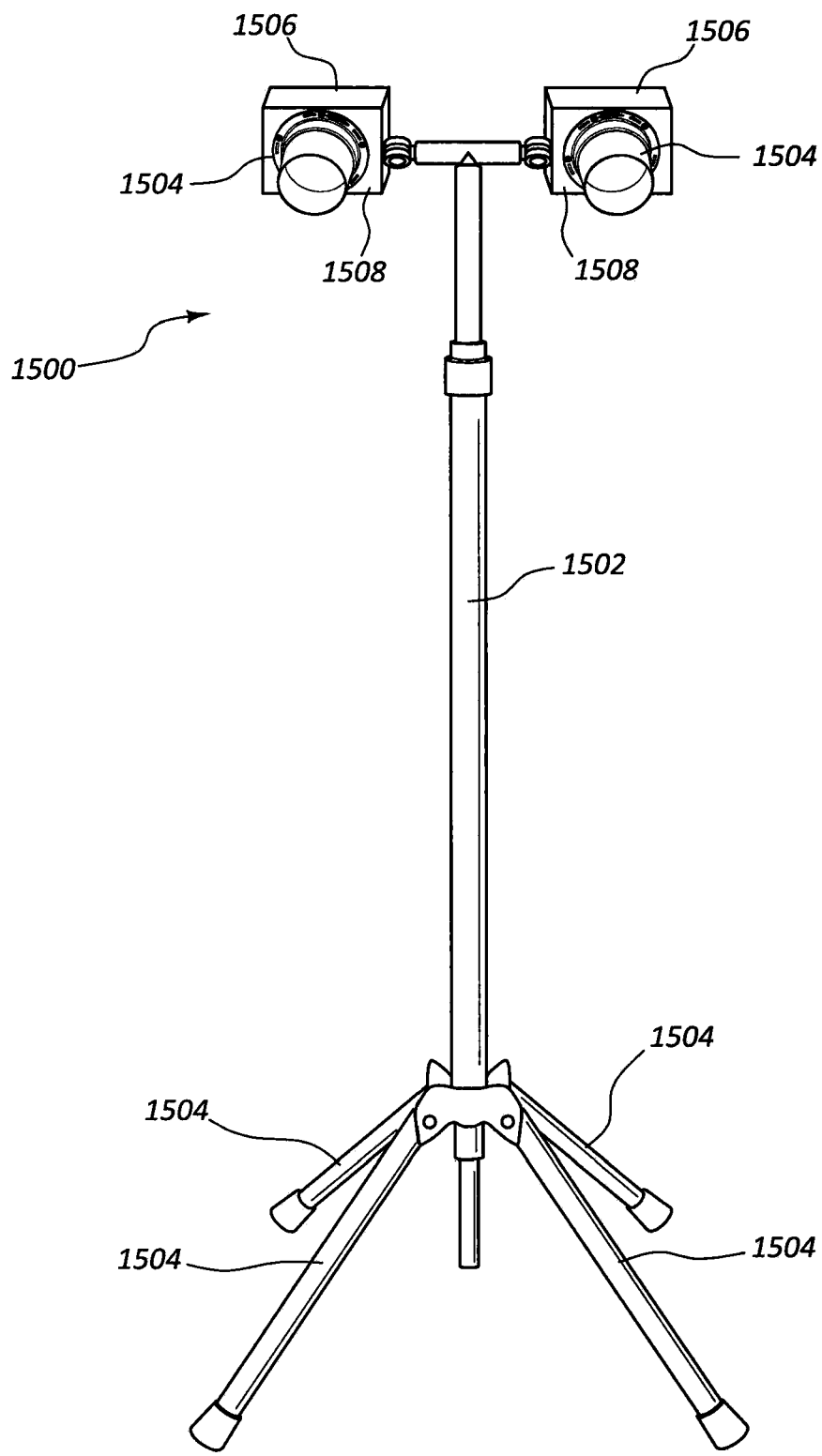
FIG. 15 is a second alternative application of an embodiment of the present invention.

FIG. 15 shows another example application of light heads 104, 200 of the present disclosure. A portable area light 1500 is shown having a telescoping pole 1502 supported by foldable legs 1504. The upper end of the pole 1502 may retain a plurality of light heads 1504 individually or in a light head housing 1506. The light heads 1504 may be configured to direct light downward so as to light a limited area around the area light 1500. Using hooded light heads 1504 in this manner may be advantageous in roadway areas where light is needed for nighttime construction and other activities, but light is preferably shielded from directly shining into vehicles and drivers' eyes. The light heads 1504 may therefore direct light efficiently where it is needed most. Light heads 1504 may be installed in the area light 1500 using a mounting surface 1508 on the area light 1500 using methods and devices described elsewhere herein, such as, for example, in connection with FIG. 12.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A hooded light head assembly for providing directional lighting, the hooded light head assembly comprising:
   a light housing having a hood, the light housing having an internal void and a rear attachment surface;
   an internal light source positioned within the internal void and configured to direct light through the hood, the internal light source being electrically powered, the hood extending from the light housing and configured to shield the internal light source from ambient light;
   a transparent member positioned in the light housing between the internal light source and the hood;
   a plurality of insert extensions extending from the rear attachment surface, each of the plurality of insert extensions comprising a first portion and a second portion, the first portion extending rearward from the rear attachment surface, the second portion extending circumferentially away from the first portion and spaced rearward from the rear attachment surface, the plurality of insert extensions being configured to attach the light housing to a mounting surface upon insertion of each of the plurality of insert extensions into a plurality of openings in the mounting surface and upon rotation of the light housing relative to the mounting surface;
   a locking tab extending rearward from the rear attachment surface, the locking tab being configured to attach the light housing to the mounting surface upon rotation of the light housing in a first direction, the locking tab preventing rotation of the light housing in a second direction opposite the first direction.

2. The hooded light head assembly of claim 1, wherein the locking tab releasably prevents rotation of the light housing.

3. The hooded light head assembly of claim 1, wherein the locking tab prevents rotation by being insertable into a locking aperture in the mounting surface.

4. The hooded light head assembly of claim 1, further comprising the mounting surface.

5. The hooded light head assembly of claim 4, wherein the mounting surface is part of an arrow board.

6. The hooded light head assembly of claim 4, wherein the mounting surface is part of a traffic light signal.

7. The hooded light head assembly of claim 4, wherein the mounting surface is part of an area light.

8. The hooded light head assembly of claim 4, wherein the mounting surface comprises a plurality of openings and a plurality of light housings interlocked with the plurality of openings.

9. The hooded light head assembly of claim 1, wherein the light housing is configured to only be secured to the mounting surface by the plurality of insert extensions.

10. The hooded light head assembly of claim 1, further comprising a rotationally asymmetric lens positioned within the light housing and configured to refract light emitted from the internal light source through the hood.

11. The hooded light head assembly of claim 1, wherein the light housing is sealed against invasion of dust or water to the internal light source.

12. The hooded light head assembly of claim 11, further comprising an air-permeable vent in the light housing.

13. The hooded light head assembly of claim 1, further comprising an electronic controller configured to control the internal light source.

14. The hooded light head assembly of claim 13, wherein the electronic controller comprises a touch-based control instrument.

15. The hooded light head assembly of claim 13, wherein the electronic controller is configured to output a signal indicating an inoperative internal light source positioned in the light housing.

16. The hooded light head assembly of claim 13, wherein the electronic controller is configured to automatically sense a quantity of internal light sources positioned in the light housing.

17. The hooded light head assembly of claim 13, further comprising an ambient light sensor, wherein the electronic controller is configured to adjust light intensity of the internal light source in response to a measurement transduced by the ambient light sensor.

18. A method of installing a light head to a mounting surface, the method comprising:
providing a mounting surface panel, the mounting surface panel having a plurality of mating openings surrounding a light opening, the plurality of mating openings being spaced apart from the light opening;
providing a light head having a rear surface, the light head having a plurality of mating inserts extending from the rear surface, the plurality of mating inserts each comprising a first portion and a second portion, the first portion extending rearward from the rear surface, the second portion extending circumferentially away from the first portion and spaced rearward from the rear surface;
inserting the plurality of mating inserts into the plurality of mating openings;
securing the plurality of mating inserts in the plurality of mating openings by rotating the light head relative to the mounting surface panel.

19. The method of claim 18, wherein the light head is permanently locked within the plurality of mating openings upon rotation.

20. The method of claim 18, wherein rotating the light head relative to the mounting surface panel secures a locking tab in the mounting surface panel, the locking tab preventing reverse rotation of the light head.

21. The method of claim 20, further comprising unlocking the locking tab by withdrawing the locking tab from the mounting surface panel.

22. A directional lighting apparatus, comprising:
a plurality of lighted head assemblies each having an internal light source and a hood configured to direct light from the internal light source, the plurality of lighted head assemblies each having a rear surface, the rear surfaces each having a plurality of mating inserts extending from the rear surface, the plurality of mating inserts each comprising a first portion and a second portion, the first portion extending rearward from the rear surface, the second portion extending circumferentially away from the first portion and spaced rearward from the rear surface;
a panel having a plurality of slots, each of the plurality of mating inserts being insertable into at least one of the plurality of slots;
a controller controlling the plurality of internal light sources, the controller being configured to control individual current provided to each of the plurality of light sources and configured to prevent reversed current through the plurality of light sources.

23. The directional lighting apparatus of claim 22, wherein the controller is configured to indicate a status of the plurality of light sources.

24. The directional lighting apparatus of claim 22, further comprising an ambient light sensor, wherein the controller is configured to control brightness of the plurality of light sources based on a measurement sensed by the ambient light sensor.

25. The directional lighting apparatus of claim 22, further comprising a touch panel connected to the controller, wherein the touch panel is configured to control a lighting pattern formed by the plurality of lighted head assemblies.

26. The directional lighting apparatus of claim 22, wherein the controller is configured to detect a quantity of lighted head assemblies in the directional lighting apparatus.

* * * * *